(12) United States Patent
Heyman

(10) Patent No.: US 7,319,639 B2
(45) Date of Patent: Jan. 15, 2008

(54) ACOUSTIC CONCEALED ITEM DETECTOR

(75) Inventor: Joseph S. Heyman, Williamsburg, VA (US)

(73) Assignee: Luna Innovations Incorporated, Roanoke, VA (US)

( * ) Notice: Subject to any disclaimer, the term of this patent is extended or adjusted under 35 U.S.C. 154(b) by 246 days.

(21) Appl. No.: 11/069,665

(22) Filed: Feb. 28, 2005

(65) Prior Publication Data

US 2006/0169029 A1    Aug. 3, 2006

Related U.S. Application Data

(60) Provisional application No. 60/638,339, filed on Dec. 20, 2004.

(51) Int. Cl.
*G01S 15/89* (2006.01)
*G01S 15/66* (2006.01)

(52) U.S. Cl. .......................... 367/92; 73/620

(58) Field of Classification Search .......... 367/7, 367/92; 73/618, 620, 625
See application file for complete search history.

(56) References Cited

U.S. PATENT DOCUMENTS

| | | | | |
|---|---|---|---|---|
| 4,554,836 A * | 11/1985 | Rudd | | 73/657 |
| 5,889,870 A | 3/1999 | Norris | | 381/77 |
| 5,903,516 A | 5/1999 | Greenleaf et al. | | 367/92 |
| 5,921,928 A | 7/1999 | Greenleaf et al. | | 600/437 |
| 5,991,239 A | 11/1999 | Fatemi-Booshehri et al. | | 367/164 |
| 6,428,532 B1 | 8/2002 | Doukas et al. | | 606/9 |
| 6,440,075 B1 | 8/2002 | Averkiou | | 600/443 |
| 6,511,429 B1 | 1/2003 | Fatemi et al. | | 600/443 |
| 6,544,182 B2 | 4/2003 | Averkiou | | 600/455 |
| 6,577,738 B2 | 6/2003 | Norris et al. | | 381/77 |
| 6,709,407 B2 | 3/2004 | Fatemi | | 600/559 |
| 6,775,388 B1 | 8/2004 | Pompei | | 381/191 |
| 2003/0083595 A1 | 5/2003 | Fatemi | | 600/591 |
| 2004/0059220 A1 | 3/2004 | Mourad et al. | | 600/442 |
| 2004/0174770 A1 * | 9/2004 | Rees | | 367/7 |

OTHER PUBLICATIONS

Wild et al., "Handheld ultrasonic concealed weapon detector", Sensors and Command, Control, Communications and Intelligence (C3I) Technologies for Homeland Defence and Law Enforcement, Proceedings of SPIE, vol. 4708, (2002).*

(Continued)

*Primary Examiner*—Ian J. Lobo
(74) *Attorney, Agent, or Firm*—Lumen Intellectual Property Services, Inc.

(57) ABSTRACT

The present invention is directed towards an acoustic concealed item detector and related methods for detection using acoustics. In an illustrative embodiment, a multi-frequency ultrasonic wave generator generates in a gaseous medium at least first and second ultrasonic waves. The multi-frequency ultrasonic wave generator is arranged such that in operation, the first ultrasonic wave and the second ultrasonic wave mix in a prescribed mixing zone to produce a difference-frequency acoustic wave. A receiver sensor detects the difference-frequency acoustic wave and produces corresponding electromagnetic signals. The electromagnetic signals are processed by a system processor and signals indicative of concealed items are identified. Preferably the ultrasonic waves are focused to a small prescribed mixing zone. Parametric and multi-transducer embodiments are disclosed.

41 Claims, 7 Drawing Sheets

OTHER PUBLICATIONS

F. S. Felber et al., Ultrasound Sensor for Remote Imaging of Concealed Weapons, Meeting date Nov. 18-22, 1996, Boston MA, USA, SPIE Proceedings vol. 2938, pp. 110-119.

Franklin Felber et al., Handheld Ultrasound Concealed-Weapons Detector, Nov. 1998, Bostn MA, USA, Conference on Enforcement and Security Technologies vol. 3575, pp. 89-98.

Franklin Felber et al., Handled Remote Concealed-Weapons Detector, Final Technical Report, J200-99-0032/3031, Feb. 1999, pp. 1-12; Appendix A pp. 1-12.

Peter L. Nacci et al., Detecting Concealed Weapons: Technology Research at the National Institute of Justice, Corrections Today, American Correctional Association, Jul. 2001, vol. 63, No. 4, (4 pages).

Mostafa Fatemi et al., Ultrasound-Stimulated Vibro-Acoustic Spectrography, Science vol. 280, Apr. 3, 1998, pp. 82-85.

Nicholas G. Paulter, Guide to the Technologies of Concealed Weapon and Contraband Imaging and Detection, NIJ Guide 602-00, Feb. 2001, pp. 1-56.

Peter J. Westervelt, Scattering of Sound by Sound, The Journal of Acoustical Society of America, vol. 29, No. 2, Feb. 1957, pp. 199-203.

Mostafa Fatemi et al., Vibro-acoustography: An Imaging Modality Based on Ultrasound-stimulated Acoustic Emission, Proc. Natl. Acad. Sci., Jun. 1999, p. 6603.

Franklin Felter et al., Handheld Remote Concealed-Weapons Detector: Final Technical Report, National Institute of Justice/NCJRS, Publication date: 1999, (NCJ No. 178564). This abstract can be accessed with the NCJRS Abstracts Database URL: http://abstractsdb.ncjrs.org/content/AbstractsDB_Search.asp.

Acoustic Sensors Product Description http://www.jaycor.com/jaycor_main/web-content/eme_sens_acoustic.html.

Acoustic Sensors Applications http://www.jaycor.com/jaycor_main/web-content/eme_sens_acoustic_apps.html.

Acoustic Sensors Technical Specifications http://www.jaycor.com/jaycor_main/web-content/eme_sens_acoustic_tech.html.

Ultrasound Sensor for Remote Imaging of Concealed Weapons http://www.jaycor.com/jaycor_main/web-content/eme_sens_ultra.html.

* cited by examiner

ACOUSTIC CONCEALED ITEM DETECTOR

CROSS-REFERENCE TO RELATED APPLICATIONS

This application claims priority under USC 119(e) of provisional patent application Ser. No. 60/638,339 filed Dec. 20, 2004 entitled "NON-LINEAR ACOUSTIC CONCEALED WEAPONS DETECTOR," which is hereby incorporated by reference in its entirety.

GOVERNMENT LICENSE RIGHTS

The U.S. Government has a paid-up license in this invention and the right in limited circumstances to require the patent owner to license others on reasonable terms as provided for by the terms of contract No. FA8750-04-C-0043 awarded by the Air Force Research Lab for the Department of Justice.

FIELD OF THE INVENTION

The present invention relates to detection of concealed items. In particular, it relates to acoustic concealed item detectors.

BACKGROUND OF THE INVENTION

Detecting concealed weapons has been a major concern of law enforcement for decades, but today's most widely used technology, metal detectors, only provide a partial solution. Metal detectors can only detect weapons that produce magnetic signals above a certain threshold, so non-metallic weapons or small metal objects like box cutters and razor blades often go undetected. Even worse, as the distance between the sensor and the target increases, even large objects like guns only produce faint signals.

While there are a number of alternative concealed weapons detection (CWD) technologies in development that could overcome this problem, each has its own limitations. In some cases, such as ultrawideband millimeter wave or terahertz imaging, the cost of the system is in the $100,000 range and the resulting anatomically accurate images raise serious privacy concerns. Other systems, such as magnetic gradiometers, are more sensitive than current metal detectors and competitively priced. However, they still can only detect weapons made of ferromagnetic materials. [1]

Acoustic sensing has received comparatively little attention as an alternative CWD technology, even though it could be a cost-competitive alternative to metal detectors, and can detect weapons of any material composition. In addition, privacy and safety are not problems with acoustics because acoustic imaging does not provide precise anatomical detail of the person scanned, and because it is safe.

Felber et al. [2-4], developed an air-coupled acoustic imager that could detect characteristic "glints" of weapons concealed under heavy clothing at ranges up to 15 feet with a 40 kHz ultrasonic wave. This prototype employed a single, focused ultrasound transducer operating in a pulse-echo imaging mode. Unfortunately, the prototype also displayed a low signal-to-clutter ratio (caused by reflections from clothing) and was very sensitive to changes in the orientation of the weapon (normal incidence reflections produce the largest signals). As a result, the prototype had a high false alarm rate and a low probability of detection. A different device built by Jaycor operates at a frequency of about 70 to 100 kHz, and can resolve objects to about 4 to 6 inches at distances of 10 to 15 feet [5]. Such resolution can still allow smaller dangerous items to go undetected. Whether the issues associated with the probability of detection and false alarm rate have been resolved is unclear.

These shortcomings of traditional pulse-echo imaging are the result of some fundamental properties of ultrasonic waves. Air-coupled ultrasound detectors must operate at frequencies that can reach the subject, define an interrogation area, and penetrate clothing. These are inverse requirements: high frequency is needed to define a small spot size yet low frequency is needed to penetrate clothing. In fact, Nacci and Mockensturm [6] observe that although ultrasound systems are less expensive than radar, "ultrasound does not penetrate clothing as well as radar."

Ultrasonic waves are often used in medical applications, both as an imaging technology and for therapeutic use. Fatemi and Greenleaf [7-8] developed a technique for medical applications called vibro-acoustography or ultrasound-stimulated acoustic emission. In this approach, acoustic energy was emitted from solids and tissues in response to an oscillatory radiation force produced by interfering focused beams of ultrasound. A series of patents and patent applications by these innovators [9-13] disclose various medical applications that exploit modulation of an ultrasonic wave and/or interfering ultrasonic waves to produce non-linear effects. Note that in typical medical applications, the ultrasonic transducer is either coupled directly to the body to be probed or the coupling is accomplished through the use of a liquid or gel intermediary. Air coupling would result in significant loss of ultrasonic energy at the air-body interface.

Additional medical applications are discussed by Averkiou [14-15] for performing non-linear echo signal imaging and to detect features excited by higher harmonics. Doukas [16] reports the therapeutic use of non-linear ultrasonic effects. In the examples given, the non-linearly produced waves are also in the ultrasonic frequency range.

In air, ultrasonic waves experience much stronger absorption than audible acoustic waves. However, given sufficiently strong ultrasonic waves, the non-linear effects can be used to advantage. Norris [17] developed a system for generating audible acoustic waves through the principle of acoustical heterodyning. His approach comprises two ultrasonic frequency transducers that are oriented so as to cause interference between emitted ultrasonic wave trains. When the difference in frequency between the two ultrasonic wave trains is in the audible frequency range, a new, audible wave train emanates outward from within the region of heterodyning interference. A different embodiment of the system employs parametric generation of the ultrasonic waves from a single ultrasonic direct radiating element. A later patent by Norris and Croft [18] further exploits the parametric version together with a reflective environment to form a surround-sound system.

Pompei [19] discusses the development of versatile and efficient transducers that are suitable for parametric as well as other ultrasonic applications. His transducers overcome previous transducer performance limitations that have inhibited the further development of parametric loud-speakers.

In summary, concealed weapons that contain metal can be detected easily with magnetometers from a close range such as an airport portal or a hand wand. Non-metallic weapons and concealed weapons at a distance are difficult to detect. While there are a number of alternative CWD technologies in development that could overcome this problem, each has its own limitations. In some cases, such as ultrawideband, millimeter wave or terahertz imaging, the cost of the system is in the $100,000 range and the resulting anatomically accurate images raise serious privacy concerns. These systems may also have limited range capability. Other systems, such as magnetic gradiometers, are more sensitive than current metal detectors and competitively priced. However, they still can only detect weapons made of ferromagnetic materials and have range issues [1]. X-ray backscatter has proven of interest but any increase in human dose may be unacceptable and the range is very limited. Hand manipulation is effective but puts the examiner at risk and is a slow process that is an invasion of privacy. Direct ultrasonics has been applied and found to be lacking in ability to discriminate weapons, especially smaller ones. Although the medical use of ultrasonic detection is well developed, it relies heavily on the strong coupling of an ultrasonic source to the body of interest, either through direct coupling, or a liquid or gel. The use of acoustical heterodyning in air is relatively new and its applications have been focused on entertainment systems.

[1] N. G. Paulter. "Guide to the Technologies of Concealed Weapon and Contraband Imaging and Detection." NIJ Guide 602-00. National Institute of Justice Law Enforcement and Corrections Standards and Testing Program. February 2001.

[2] F. Felber, N. Wild, S. Nunan, D. Breuner, and F. Doft. "Handheld Remote Concealed Weapons Detector." National Institute of Justice Final Technical Report J200-99-0032/3031. February 1999.

[3] F. S. Felber, C. Mallon, N. C. Wild, and C. M. Parry. "Ultrasound sensor for remote imaging of concealed weapons." In SPIE Proceedings Vol. 2938, *Command, Control, Communications, and Intelligence Systems for Law Enforcement*, Eds: D. Spector, and E. M. Carapezza, pp. 110-119, November, 1996.

[4] F. Felber, N. Wild, S. Nunan, D. Breuner, and F. Doft. "Handheld ultrasound concealed weapons detector," In SPIE Proceedings, Vol. 3575, *Conference on Enforcement and Security Technologies*, pp. 89-98, November, 1998.

[5] Jaycor web pages, http://wwwjaycor.com/jaycor_main/web-content/eme_sens_acoustic.html, http://www-jaycor.com/jaycor_main/web-content/eme_sens_acousti-c_apps.html, http://wwwjaycor.com/jaycor_main/web-content/eme_sens_acoustic_tech.html, http://wwwjaycor.com/jaycor_main/web-content/eme_sens_ultra.html.

[6] Nacci, P. L. and Mockensturm, L. "Detecting Concealed Weapons: Technology Research at the National Institute of Justice." *Corrections Today*, Vol. 63, No. 4, July, 2001.

[7] M. Fatemi and J. F. Greenleaf. Vibro-acoustography: An imaging modality based on ultrasound-stimulated acoustic emission. *Proc. Natl. Acad. Sci.* 96: 6603-6608 (1999).

[8] M. Fatemi and J. F. Greenleaf. "Ultrasound-Stimulated Vibro-Acoustic Spectrography," *Science*, Vol. 280, No. 3, April, 1998.

[9] Greenleaf, et al, U.S. Pat. No. 5,903,516, "Acoustic force generator for detection, imaging and information transmission using the beat signal of multiple intersecting sonic beams."

[10] Greenleaf, et al, U.S. Pat. No. 5,921,928, "Acoustic force generation by amplitude modulating of a sonic beam."

[11] Fatemi, et al, U.S. Pat. No. 5,991,239, "Confocal Acoustic Force Generator."

[12] Fatemi, et al, U.S. Pat. No. 6,511,429, "Ultrasonic methods and systems for reducing fetal stimulation."

[13] Fatemi, et al, U.S. Pat. No. 6,709,407, (also see U.S. patent application Ser. No. 20030083595), "Method and apparatus for fetal audio stimulation."

[14] Averkiou, U.S. Pat. No. 6,440,075, "Ultrasonic diagnostic imaging of nonlinearly intermodulated and harmonic frequency components."

[15] Averkiou, U.S. Pat. No. 6,544,182, "Ultrasonic non-linear imaging at fundamental frequencies."

[16] Doukas, U.S. Pat. No. 6,428,532, "Selective tissue targeting by difference frequency of two wavelengths."

[17] Norris, U.S. Pat. No. 5,889,870, "Acoustic heterodyne device and method."

[18] Norris, et al, U.S. Pat. No. 6,577,738, "Parametric Virtual Speaker and Surround-Sound System."

[19] Pompei, U.S. Pat. No. 6,775,388, "Ultrasonic transducers."

SUMMARY OF THE INVENTION

An acoustic concealed item detector takes advantage of linear, non-linear, or both linear and non-linear acoustic phenomena. The term "acoustic" as used here refers generally to radiating compression waves in a transmission medium (e.g., air). Acoustic waves in the audible frequency range (roughly between 20 Hz and 20 KHz) will be referred to as sonic or audible. Acoustic waves with frequencies greater than about 20 KHz will be referred to as ultrasonic. The term "beam" as used herein refers to a highly directive wave. When used as a verb, to beam implies to produce a highly directive wave. A focused wave is a beam with a local amplitude maximum at the focus.

The acoustic concealed item detector is designed to find hidden weapons or other contraband under clothing or inside a structure. The acoustic concealed item detector gives the police a tool to assess at a distance the potential threat of a person who might be carrying a concealed weapon. Detecting a concealed item behind a fabric or material-covered target or suspect area is particularly difficult with ultrasonic waves. In this case material is intended to include non-fabric linings or sheets, for instance a rubber sheet or a metal foil lining. Ultrasonic waves typically have trouble penetrating fabric or material-covered targets. Therefore, the typical acoustic concealed item detector embodiment involves generating in air, other gaseous medium, or in general, any medium capable of transmitting acoustic waves, a localized acoustic wave, preferably with a frequency below 20 KHz. A localized acoustic wave is one that appears to emanate from a region much smaller than its wavelength. Although the generation of such a localized acoustic wave in a gaseous medium is preferable, the invention is not so restricted. Similarly, although the generated localized acoustic waves are preferably below about 20 KHz, this is not required. The generated localized acoustic wave is then scanned over the target area. Interactions (such as reflections, scatterings, diffractions, and frequency-shiftings) of the localized acoustic wave are sensed, and signals indicative of concealed items beneath the fabric or material-covered target area are identified.

The localized acoustic wave is most preferably generated by the interaction of ultrasonic waves to produce a difference-frequency acoustic wave in the desired frequency range. This is possible because interactions of a first ultrasonic wave of frequency $f_1$ with second ultrasonic wave of frequency $f_2$ produce waves with frequencies $f_1$, $f_2$, $f_1+f_2$, and $f_1-f_2$, (if $f_1<f_2$ then the relevant frequency is $f_2-f_1$) as well as a static radiation pressure. (Acoustic radiation pressure is defined as the difference between the average pressure at a surface and the pressure that would have existed at the surface absent the acoustic wave.) In preferred embodiments, with appropriate choices of the frequencies $f_1$ and $f_2$, the difference frequency $f_1-f_2$ is in the audible range. This audible acoustic wave can better penetrate clothing and if localized, can also accurately interrogate a person for hidden weapons. Additional ultrasonic waves with additional frequencies can also be used to simultaneously obtain multiple difference-frequency waves or to exploit higher-order non-linear effects.

The acoustic concealed item detector gives the user the ability to focus a probing energy on a small zone and scan that zone over the object. The acoustic wave generated at the zone "sees" through clothing and can assess hidden shapes from the acoustic interaction at the zone and with the hidden weapon.

In typical embodiments, the acoustic concealed item detector directs ultrasonic beams to a prescribed mixing zone of interaction. In some embodiments, the mixing zone is defined by the crossing of the ultrasonic beams in a small concentrated acoustic interaction spot. In parametric embodiments, some mixing occurs along the entire extent of the ultrasonic beams, but preferred embodiments make use of acoustic focusing to concentrate the wave energy, effectively making the prescribed mixing zone a small concentrated acoustic interaction spot. In both cases the acoustic energy of the difference-frequency wave produced by the mixing of the two ultrasonic frequency waves is concentrated in a small concentrated acoustic interaction spot.

The small concentrated acoustic interaction spot has its size determined by the propagation characteristics of the ultrasonic waves; typically the small concentrated acoustic interaction spot has a characteristic size of several wavelengths. Within that small concentrated acoustic interaction spot the majority of the energy of the difference-frequency acoustic wave is generated as a localized acoustic wave. The small concentrated acoustic interaction spot, and hence the corresponding localized acoustic wave, is then scanned over the target area to reveal internal properties that are not seen by the ultrasonic waves alone. Because of its relatively low frequency, the difference-frequency acoustic wave is able to penetrate more easily various methods of enclosure, such as clothing. Interactions (such as reflections, scatterings, diffractions, and frequency-shiftings) of the difference-frequency acoustic wave are detected by a receiver sensor, such as a microphone or a laser vibrometer, and the information is transmitted to a system processor, which determines if the pattern of detected acoustic waves is indicative of a concealed weapon or other potentially dangerous items. In embodiments with a laser vibrometer, the vibrations sensed are those of the enclosure. In contrast, embodiments with a microphone typically sense acoustic waves radiating outward from the enclosure. In some embodiments, detection of the ultrasonic-frequency waves is also of interest and can be detected and used for diagnostic purposes.

In operation, some embodiments of the acoustic concealed item detector will be hand-held by an officer who will point it at a target area. Preferably one or more optical location indicators (laser or light beam) will illuminate the small concentrated acoustic interaction spot with visible or infrared light. In some embodiments in which two crossed ultrasonic beams are mixed, the focus location of the two ultrasonic beams is actively optimized by exploiting information associated with reflections of the one or more optical location indicators from the target area. The difference-frequency acoustic wave reflects, scatters, and generally interacts with the target area and the materials that underlie it, the interactions being influenced by the acoustic impedance and geometry of the mixing zone, and most importantly by the small concentrated acoustic interaction spot. A hidden weapon will alter the impedance and interaction of the difference-frequency acoustic wave, thereby providing a means for its detection.

A physical embodiment of an acoustic concealed item detector typically includes a multi-frequency ultrasonic wave generator. The multi-frequency ultrasonic wave generator produces in a gaseous medium at least a first ultrasonic wave having frequency $f_1$, and a second ultrasonic wave having frequency $f_2$. In some preferred embodiments, the frequencies $f_1$ and $f_2$ are both between 100 KHz and 200 KHz, and the multi-frequency ultrasonic wave generator is arranged such that in operation, the first ultrasonic wave and the second ultrasonic wave are focused to a prescribed mixing zone having a characteristic size of less than about 0.2 cm within which a difference-frequency acoustic wave is produced. In these preferred embodiments, the difference-frequency acoustic wave has a frequency less than 20 KHz. Additional ultrasonic waves can also be produced to provide for further non-linear interactions. The typical acoustic concealed item detector also includes a receiver sensor for detecting interactions of the difference-frequency acoustic wave and producing corresponding electromagnetic signals. The electromagnetic signals can be transmitted by wire or some other waveguide, or can be broadcast wirelessly. The electromagnetic signals are received by a system processor and processed to identify signals indicative of concealed items. In preferred embodiments, the concealed items are weapons, which typically provide a hard surface from which the difference-frequency acoustic wave scatters.

Other embodiments specifically generate the difference-frequency acoustic wave parametrically. In such an embodiment, the multi-frequency ultrasonic wave generator generates parametrically with a single transducer at least a first focused ultrasonic wave and a second focused ultrasonic wave. Here the multi-frequency ultrasonic wave generator is arranged such that in operation the first focused ultrasonic wave and the second focused ultrasonic wave are focused to a prescribed mixing zone wherein a difference-frequency acoustic wave is predominantly produced from the interaction of the first focused ultrasonic wave and the second focused ultrasonic wave. A receiver sensor detects the difference-frequency acoustic wave and produces corresponding electromagnetic signals. The system processor processes the electromagnetic signals and identifies signals indicative of concealed weapons.

Additional embodiments of the acoustic concealed item detector provide for applications beyond weapons detection, in particular, nondestructive evaluation. The acoustic concealed item detector can provide for extremely high resolution with a low frequency acoustic wave.

Therefore, alternative embodiments of the acoustic concealed item detector correspond to a method for high-resolution scanning of a target. In this method, ultrasonic waves are mixed, preferably in a gaseous medium, to produce a difference-frequency acoustic wave. In these embodiments, the difference-frequency acoustic wave preferably has a difference frequency less than 20 KHz. In addition, the difference-frequency acoustic wave has a localized effective source that is small relative to the difference-frequency acoustic wave wavelength. The method further involves scanning the target with the localized effective source of the difference-frequency acoustic wave and sensing interactions of the difference-frequency acoustic wave. The interactions can be with one or more of the target, the surrounding environment, and the ultrasonic waves. Information about the target is then determined from the interactions.

This method can be very useful for gaseous-medium-coupled ultrasonics into materials for which direct solid contact would be undesirable, such as skin wounds, hot materials, high purity liquids, moving surfaces, art work. The combined performance properties of ultrasonic-wavelength-like resolution and the ability to couple with and penetrate into materials that strongly damp ultrasonic waves are not otherwise possible.

Additional features and advantages of the invention will be set forth in part in the description that follows, and in part will be obvious from the description, or may be learned by practice of the invention. Various embodiments of the invention do not necessarily include all of the stated features or achieve all of the stated advantages.

BRIEF DESCRIPTION OF THE DRAWINGS

The accompanying drawings illustrate an embodiment of the invention according to the best modes so far devised for the practical application of the principles thereof.

DETAILED DESCRIPTION

Figure 1A:
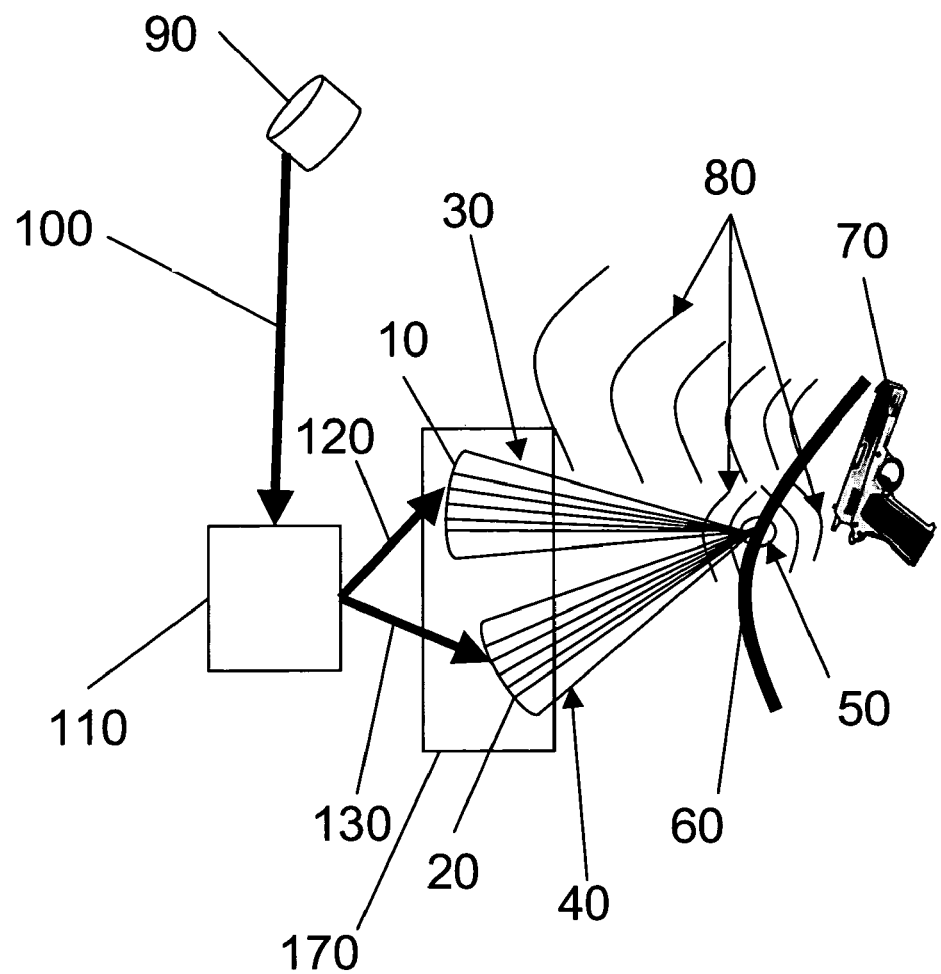
FIGS. 1A-D illustrate dual-transducer embodiments of the acoustic concealed item detector.

Non-linear acoustics can be better understood physically by modeling the transmission medium and including the effect of the acoustic pressure on the density. For most applications considered here, the transmission medium is a gas, most typically air.

The density, $\rho$, of the transmission medium depends on the acoustic environment:

$$\rho = \rho_0(1+\delta)$$

where $\rho_0$ is the static density and $\delta$ is the incremental increase in density produced by the acoustic wave.

The acoustic pressure is then $$P = \rho_0 c A (1+\delta),$$

where c is the acoustic propagation velocity and A is the "particle velocity" that a small element within the transmission medium sees when in the presence of an acoustic wave.

For two interacting waves of sinusoidal excitation of frequencies $f_1$ and $f_2$ with corresponding wave-numbers $k_1$ and $k_2$:

$$A = A_1 \sin(2\pi f_1 t - k_1 x) + A_2 \sin(2\pi f_2 t - k_2 x).$$

Therefore, the dynamic pressure is expressed as:

$$P = \rho_0 c [A_1 \sin X + A_2 \sin Y] + \rho_0 c \delta_0 [A_1 \sin X + A_2 \sin Y]^2,$$

where X and Y are the corresponding angular arguments: $[X=(2\pi f_1 t - k_1 x)$ and $Y=(2\pi f_2 t - k_2 x)]$ and $\delta = \delta_0 A$.

This results in the following equation with terms numbered 1 through 5:

$$P = \underbrace{\rho_0 c [A_1 \sin X}_{1} + \underbrace{A_2 \sin Y]}_{2} + \rho_0 c \delta_0 [\underbrace{A_1^2 \sin^2 X}_{3} + \underbrace{2 A_1 A_2 \sin X \sin Y}_{4} + \underbrace{A_2^2 \sin^2 Y}_{5}]$$

TABLE 1

Amplitude and frequency dependence of the model solution

| Dependence | Term 1 | Term 2 | Term 3 | Cross Term 4 | Term 5 |
|---|---|---|---|---|---|
| Amplitude | $\rho_0 c A_1$ | $\rho_0 c A_2$ | $\rho_0 c \delta_0 A_1^2$ | $2\rho_0 c \delta_0 A_1 A_2$ | $\rho_0 c \delta_0 A_2^2$ |
| Frequency Components | $f_1$ | $f_2$ | $2f_1$ | $f_1 - f_2$; $f_1 + f_2$ $f_1$; $f_2$ | $2f_2$ |
| Average Over One Cycle | 0 | 0 | $[\rho_0 c \delta_0 A_1^2]/2$ | 0 | $[\rho_0 c \delta_0 A_2^2]/2$ |

The average of the first, second, and forth term in this expression over one cycle is zero. The average over one cycle of the third and fifth term, however, produces a non-zero effect known as the radiation pressure:

$$P_{ri} = [\rho_0 c A_i^2 \delta_0]/2,$$

where $P_{ri}$ is the radiation pressure associated with the wave of frequency $f_i$ and $A_i$ is the particle velocity associated with the wave of frequency $f_i$. Here, "particle" refers to a hypothetical "particle" driven by the wave at a specific location. The radiation pressures are "DC" terms, a radiation wind. By modulating the amplitudes' terms, $A_i$, the "wind" can be converted to a low frequency vibration able to penetrate clothing.

Table 1 shows that beam mixing will produce many acoustic effects. For the purposes herein, the most important are the difference-frequency elements in term 4 and linear beat frequency effects that arise between terms 1 and 2, most notably when the frequency difference $f_1 - f_2$ is small relative to the frequency average $(f_1 + f_2)/2$. In addition, the radiation pressure terms (3 and 5) can contribute if the wave amplitudes are modulated. The acoustic effect of the difference frequency in the cross term is direct acoustic excitation within the interaction zone that depends on the product of the two driving particle velocity amplitudes. All these phenomena have the potential to probe through obscuring clothing or material to reveal concealed weapons.

Figure 1B:
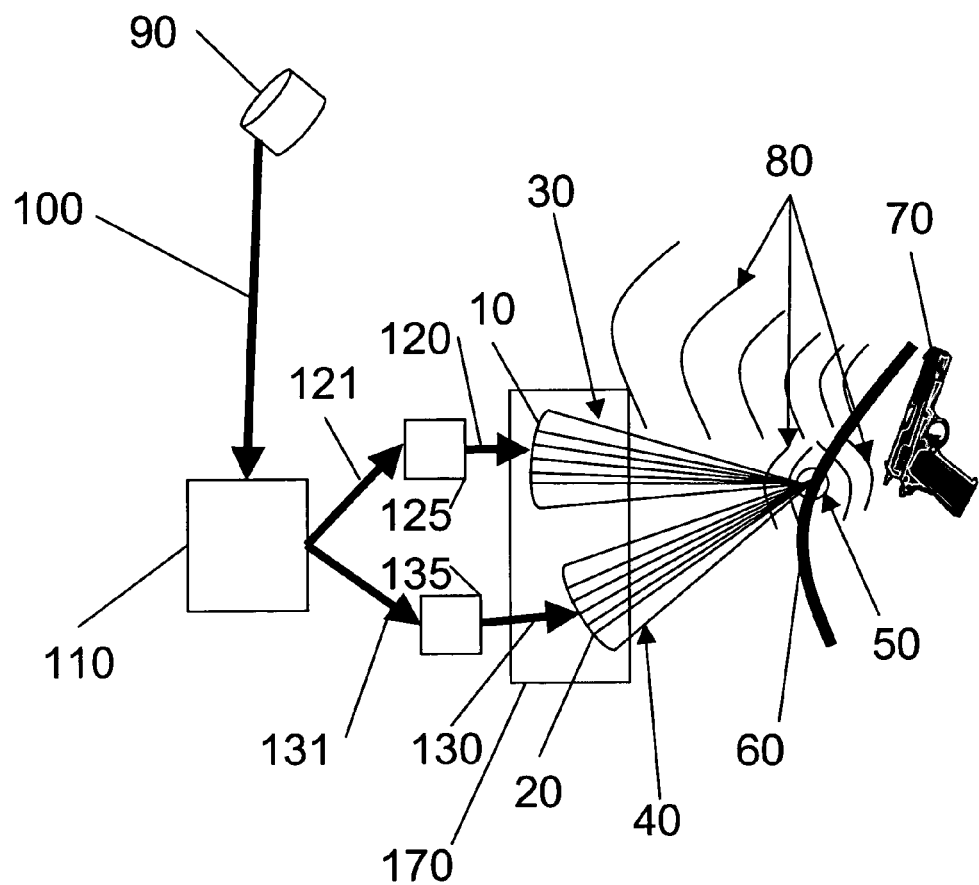
Figure 1C:
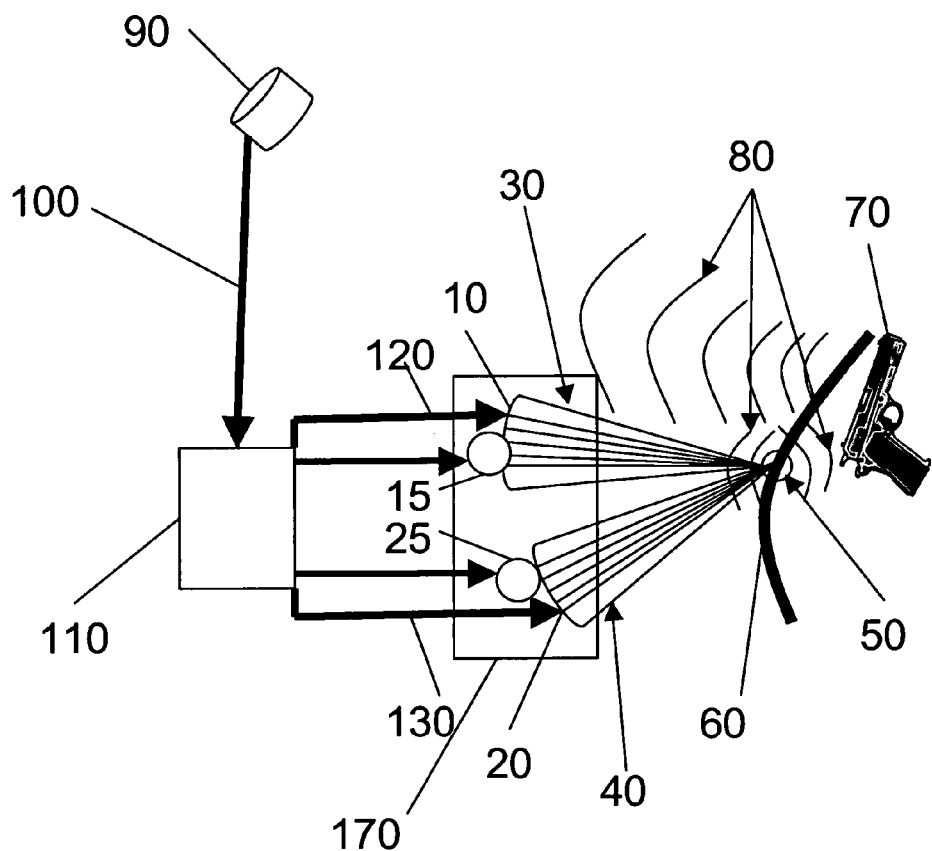
Figure 1D:
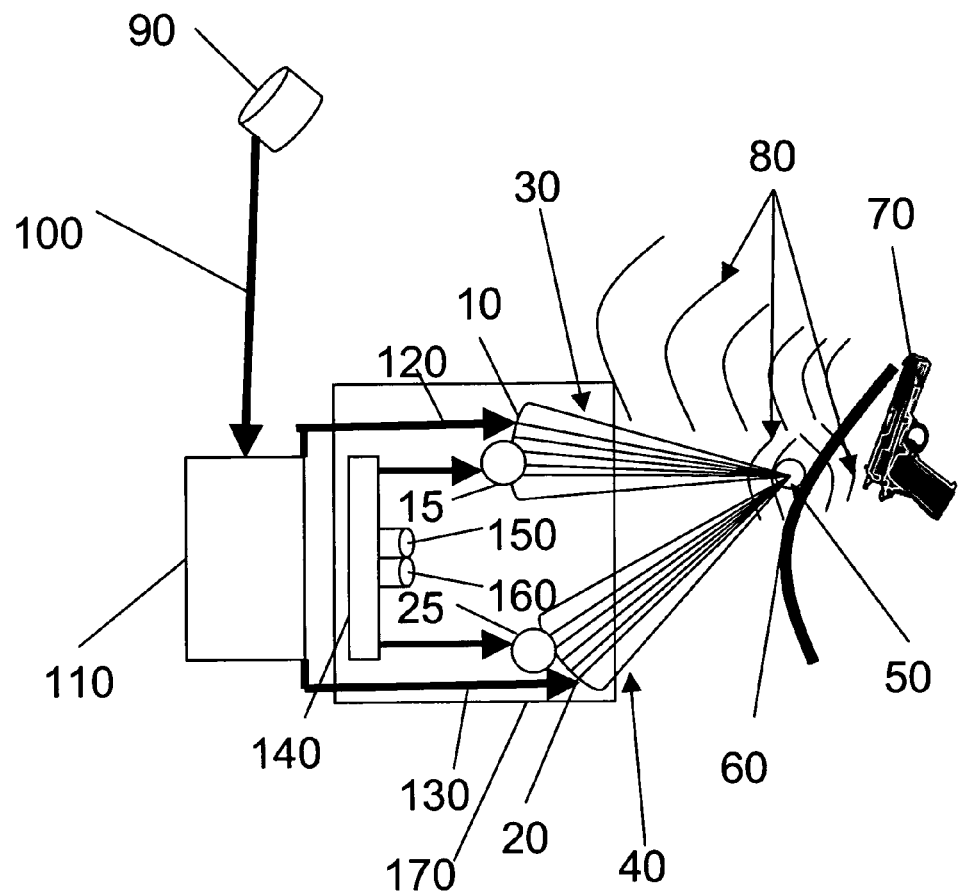

Referring now to the drawings, FIG. 1A shows an embodiment of the acoustic concealed item detector. This embodiment and the other embodiments shown in FIGS. 1B-1D are called dual-transducer embodiments because they employ two separate transducers. A first transducer 10 generates a first ultrasonic wave having frequency $f_1$. The first ultrasonic wave is focused along a first propagation path 30. A second transducer 20 generates a second ultrasonic wave having frequency $f_2$. The second ultrasonic wave is focused along a second propagation path 40. Although focusing of the ultrasonic waves is not necessary, the use of focused waves is preferred.

In this embodiment, the first transducer 10 and the second transducer 20 together comprise a multi-frequency ultrasonic wave generator 170. Here and in subsequent drawings, the components that make up the multi-frequency ultrasonic wave generator 170 are enclosed within a box. However, the details of how the various elements are mounted and coupled can be varied in any appropriate way. The purpose of the multi-frequency ultrasonic wave generator 170 is to produce at least first and second ultrasonic waves. In preferred embodiments, this is done in a gaseous medium. The gaseous medium is typically air, but it is not limited to air. In preferred embodiments, the multi-frequency ultrasonic wave generator 170 is arranged so that in operation, the first ultrasonic wave and the second ultrasonic wave mix in a prescribed mixing zone 50 to produce a difference-frequency acoustic wave 80.

In some embodiments the prescribed mixing zone 50 is small, typically less than about 0.2 cm when the frequencies of both ultrasonic waves are between 100 KHz and 200 KHz. If the difference-frequency acoustic wave has frequency less than about 20 KHz, then the prescribed mixing zone 50 is on the order of 10 times smaller than the wavelength of the difference-frequency acoustic wave. In some embodiments, the frequencies of the ultrasonic waves are between about 140 KHz and 160 KHz and the frequency of the difference-frequency acoustic wave is less than 10 KHz.

In FIG. 1A, the prescribed mixing zone 50 extends on both sides of the fabric covering 60. To enhance readability in all the figures, the prescribed mixing zone 50 is not shown to scale. In preferred embodiments, the prescribed mixing zone 50 would be smaller than shown. Although the prescribed mixing zone 50 is shown symmetrically shaped, that is not necessary. For instance, in some embodiments, appropriately configured transducers focus the ultrasonic waves into a cylindrically-shaped mixing zone. Entirely asymmetrically shaped prescribed mixing zones are also considered within the scope of the invention.

A prescribed mixing zone 50 extending on both sides of the fabric covering 60 provides for a rich set of interactions of the first and second ultrasonic waves and the difference-frequency acoustic wave 80 with the fabric covering 60, the weapon 70, and any other objects. The interactions could include reflections, scatterings, diffractions, and frequency-shiftings. Alternatively, the prescribed mixing zone 50 may be entirely or nearly entirely on either side of the fabric covering 60. For heavier-weight fabrics, having the prescribed mixing zone 50 entirely (or nearly entirely) on the transducer side of the fabric covering 60, generates a stronger difference-frequency acoustic wave 80 that can better penetrate the fabric covering 60, interact with the weapon 70, and radiate toward the sensor receiver 90. For lighter-weight fabrics, having the prescribed mixing zone 50 entirely (or nearly entirely) on the weapon side of the fabric covering 60 allows for greater localization, typically at the expense of signal strength.

In the most preferred embodiments, the most useful interactions involve reflections from the weapon 70 or other concealed items. However, in alternative embodiments, sophisticated processing techniques derive important information from other types of interactions, including, but not limited to scatterings, diffractions, and frequency-shiftings. These interactions can occur with the weapon, the covering, other objects or transmission media, or the ultrasonic waves.

In the particular embodiment shown in FIG. 1A, the first transducer 10 is driven by signals 120 and the second transducer 20 is driven by signals 130, both emanating from a system processor 110. The embodiment shown in FIG. 1A also includes a receiver sensor 90 for detecting the acoustic waves—in this case, the difference-frequency acoustic wave 80 (the original mixed wave and its reflection and other interaction from the weapon 70)—and producing corresponding electromagnetic signals 100. These electromagnetic signals 100 are received by the system processor 110, which processes the signals and identifies signals indicative of concealed items, such as the weapon 70 concealed under a fabric covering 60.

In preferred embodiments, the receiver sensor 90 is a microphone, but other sensors known to those skilled in the art can be used. Depending upon the particular embodiment, examples of other types of receiver sensors include, but are not limited to: a tuned mass oscillator, an accelerometer, a laser vibrometer, an optical interferometer, and a strain gage. Note that for some embodiments, for instance those including a laser vibrometer, the detected acoustic waves are those associated with vibrations of the fabric covering 60 (or other material or structure hiding the concealed item) rather than the surrounding air or other gaseous transmission media. The electromagnetic signals 100 produced by the receiver sensor 90 can be transmitted either through a waveguide (e.g., wire cables) or they may be transmitted wirelessly to the system processor 110. Wireless electromagnetic signals can be of any suitable electromagnetic frequency. In the most preferred embodiments, wireless electromagnetic signals are in either the radio, optical, or infrared frequency range.

To be most effective for detecting concealed items under a fabric or material covering, in preferred embodiments, the difference-frequency acoustic wave has a frequency $|f_1-f_2|$ less than about 20 KHz. The difference-frequency acoustic waves in this frequency range can penetrate fabric coverings 70. However, the 20 KHz limit is not required. Depending upon the specific application, frequencies higher than 20 KHz are used in some embodiments.

The multi-frequency ultrasonic wave generator 170 illustrated in FIG. 1A produces only two ultrasonic waves. However, multi-frequency ultrasonic wave generators producing more than two ultrasonic waves are within the broad scope of the invention. The benefit of producing additional ultrasonic waves can be surmised by considering the addition of a third transducer (not shown) for producing a wave of frequency $f_3$. With three distinct waves in the system, the interactions can produce three difference-frequency waves (of frequencies $|f_1-f_2|$, $|f_1-f_3|$, and $|f_2-f_3|$). In such a configuration, data from three unique difference-frequency waves could be collected simultaneously.

A variety of approaches are available for the system processor 110 to identify signals indicative of concealed items. The scattering amplitude, the resonance decay, and the frequency and spatial dependence of these parameters as a function of position are used in some embodiments to identify concealed items. Interactions of the difference-frequency wave with one or more of the ultrasonic waves also provide information indicative of concealed items. In a rudimentary approach in which the prescribed mixing zone 50 is scanned over a target area, a large change in the signal over a small distance scanned suggests the presence of an edge of a hard object and therefore is identified as a concealed item. Another approach is to perform a target area scan to obtain a detailed map of the signals as a function of mixing-zone position, with stronger signals being indicative of hard-body reflections. A detailed description of an ultrasound imaging process is described by Felber, Mallon, Wild, and Parry in Ref. [3] above, which is incorporated by reference in its entirety. The map can then be compared against a database of weapon types. If a measure of similarity between the new map and a map of a weapon type in the database exceeds a critical value, the signals would be considered indicative of a concealed weapon. Another approach is to search for one or more resonances in the signals that fit certain criteria indicative of the concealed items that are subject to search. For example, a gun typically has a tube geometry that will resonate at specific frequencies.

In the particular embodiment shown in FIG. 1A, the system processor 110 is a computer, but in alternative embodiments the system processor 110 can be specially designed electronics or other circuitry that are suitable for the system processor functions. Alternatively, in embodiments whereby a number of computers or combination of computers and other hardware circuits accomplish the various functions, the totality of that hardware should be construed as the system processor 110.

In other preferred embodiments, at least one of the first 10 and second 20 transducers is dynamically configurable. Dynamically configurable transducers can be modified while in operation. In some embodiments ultrasonic transducers are made dynamically configurable by changing the shape of a sound-reflective backing of the transducer. Preferably, such a shape change concentrates the ultrasonic wave at a different focal point. In some embodiments, the shape change of the sound-reflective backing is achieved through the use of a shape-memory alloy but other means known by those skilled in the art can also be used. In other embodiments, a multi-element ultrasonic transducer is made dynamically configurable by altering the amplitude and phase of the signals produced by various elements in the transducer. The dynamic reconfiguration of a transducer allows for the transducer focus to change during operation. This feature can be quite useful for cases in which the distance to the target varies rapidly.

In an alternative embodiment shown in FIG. 1B, the transducers are driven by signals from separate signal generators, a first signal generator 125 and a second signal generator 135. In the embodiment shown in FIG. 1B, the characteristics of those signals are determined by a first data stream 121 and a second data stream 131 that is sent by the system processor 110. However, one or more of those data streams may be predetermined, in which case they are not required to be sent. Other embodiments with various schemes for configuring the multi-frequency ultrasonic wave generator 170 and the signals that drive it are within the broad scope of the invention.

The embodiment shown in FIG. 1C is similar to that shown in FIG. 1A, but also includes a first actuator 15 coupled to the first transducer 10 and a second actuator 25 coupled to the second transducer 20. In operation, the first actuator 15 adjusts the position of the first transducer 10 to direct the first ultrasonic wave while the second actuator 25 adjusts the position of the second transducer 20 to direct the second ultrasonic wave. In the particular embodiment shown, both first 15 and second 25 actuators are coupled to the system processor 110.

In an alternative embodiment shown in FIG. 1D, the actuation is governed by signals from a second system processor 140. In this embodiment, the second system processor 140 is coupled to a light source 150 and a light sensor 160. In operation, the light source 150 illuminates a spot to be scanned. In preferred modes of operation, optical reflections from the spot are sensed by the light sensor 160 and used to determine range information to the spot. The range information is used by the second system processor 140 to determine actuation signals to be sent to the first 15 and second 25 actuators so that the positions of their associated transducers are adjusted to account for the range to the spot to be scanned. In additional embodiments, one or both transducers are dynamically configurable and responsive to the range information. Other embodiments use the sensed optical reflections to determine other properties of the spot, such as vibration information, speed, or surface characteristics (specular or diffuse). In some embodiments, the light source and the light sensor are combined into a laser vibrometer to detect vibrations of the spot to be scanned for analysis. Alternative embodiments with only a single actuator can also be configured. In yet additional embodiments, the second system processor 140 can be replaced with dedicated circuitry to perform the ranging and provide signals to the actuators. Other variations are within the broad scope of the invention.

In some preferred embodiments, the multi-frequency ultrasonic wave generator 170 and the receiver sensor 90 are disposed on a hand-held wand. This would allow the device to be hand-held by a user who would sweep the wand over the target area.

In other embodiments, the acoustic concealed item detector is configured so that at least one of the following wave characteristics for at least one of the waves can be modified during operation: the amplitude, the frequency, the beam width and the beam divergence angle. The beam width and the beam divergence angle can be varied by dynamically configuring one or both transducers. The amplitude and frequency can be varied with the use of one or both of the signal generators or the system processor.

Figure 2A:
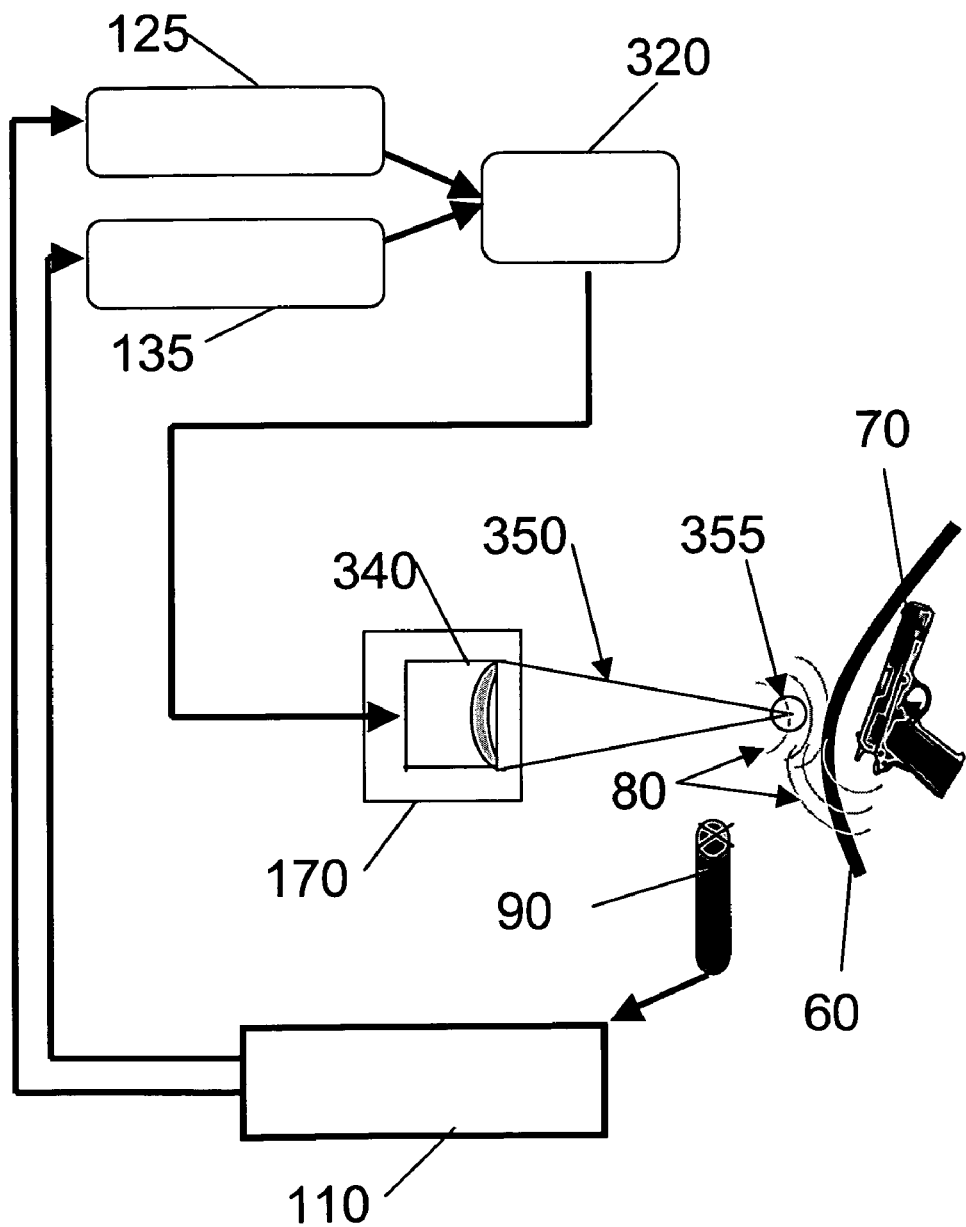
FIGS. 2A-B show parametric configurations of the acoustic concealed item detector.
Figure 2B:
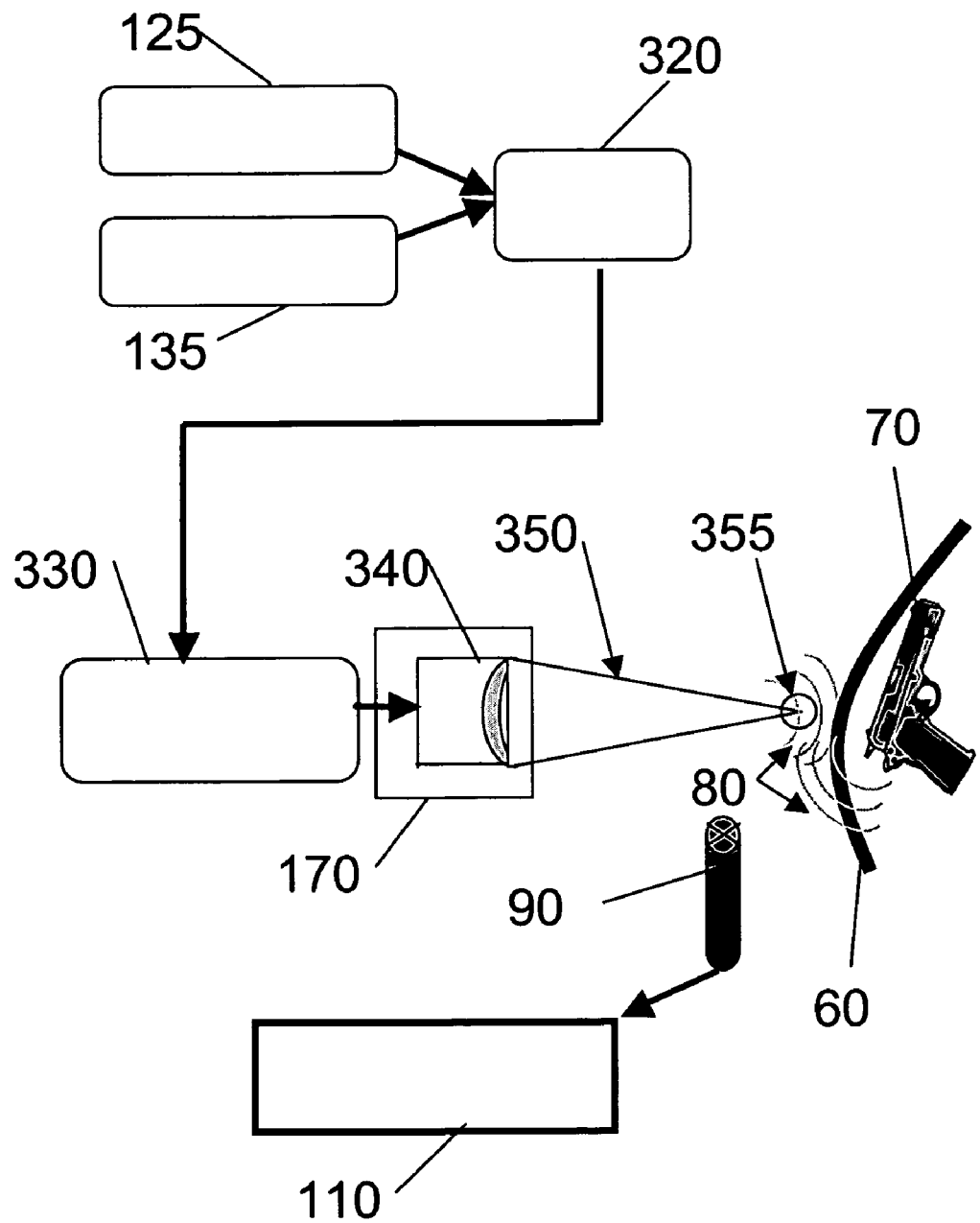

FIGS. 2A-2B show parametric embodiments of the acoustic concealed item detector. In parametric embodiments both the first ultrasonic wave and the second ultrasonic wave are generated by the same transducer. Therefore, only a single transducer element is required. Referring to FIG. 2A, data streams from the system processor 110 induce the first signal generator 125 to produce signals corresponding to a wave of frequency $f_1$ and the second signal generator 135 to produce signals corresponding to a wave of frequency $f_2$. The two different frequency waves are summed in a summing circuit 320. The summed signal is then directed to a transducer 340 that produces ultrasonic waves of frequencies $f_1$ and $f_2$. Therefore, the multi-frequency ultrasonic wave generator 170 consists only of this single transducer 340 in this embodiment. In the embodiment illustrated, the transducer 340 is a focusing transducer and both ultrasonic waves are beams that are strongly focused to a prescribed mixing zone 355. Although mixing of the ultrasonic waves occurs all along the beam path 350, it is much stronger in the prescribed mixing zone 355, which is the focus of the ultrasonic beams and is a concentrated acoustic interaction spot. The mixed-frequency acoustic wave 80 radiates primarily from the prescribed mixing zone 355, penetrates through the fabric covering 60, reflects from concealed weapon 70 and is detected by the receiver sensor 90. Although reflections from the concealed weapon 70 are shown in the figures, other interactions of the difference-frequency acoustic wave with the target and the ultrasonic waves produce acoustic waves that are detectable by the sensor receiver 90 and in various embodiments are used to identify the presence of a concealed item. As with the dual-transducer embodiments, the receiver sensor 90 produces electromagnetic signals that correspond to the detected acoustic waves. These electromagnetic signals are received by the system processor 110, which processes the signals and identifies signals indicative of concealed items.

As with the dual-transducer embodiments illustrated in FIGS. 1A-1D, many variations are possible. For instance, in FIG. 2B, an amplifier 330 is used to amplify the signals received from the summing circuit 320 before sending the amplified signals to the transducer 340. Also in FIG. 2B, the signal generators 125 and 135 produce predetermined signals, hence the data streams from the system processor 110 are not required.

Various alternative embodiments discussed in relation to the dual-transducer embodiments are also applicable to the parametric embodiments. For instance, all the previously discussed types of receiver sensors 90 are equally applicable here, additional frequency waves may be produced by the single transducer 340, the single transducer 340 may be dynamically configurable, and an actuator can be coupled to the transducer 340 for adjusting the position of the transducer 340. In some embodiments various ultrasonic wave characteristics, such as the amplitude, frequency, beam width and beam divergence angle are dynamically modifiable.

Although not shown in the figures, alternative embodiments include one or more lights that are flashed to provide a visual cue when patterns of acoustic waves indicative of concealed items are identified.

As would be clear to one skilled in the art, although explicit power sources for the various components are not shown (to reduce clutter) the embodiments include appropriate power sources coupled to the various components.

Although the embodiments discussed above have included the use of the difference frequency of two ultrasonic waves to produce an acoustic wave with a lower frequency, a method for detecting a concealed item behind a fabric or material-covered target area does not require the use of ultrasonic waves. What is required is that a localized, or more preferably a highly or very highly localized, acoustic wave be generated. As previously mentioned, a localized acoustic wave is one that appears to emanate from a region much smaller than its wavelength, say at least five times smaller than its wavelength. A highly localized acoustic wave would appear to emanate from a region more than about ten times smaller than its wavelength and a very highly localized acoustic wave would appear to emanate from a region more than about 100 times smaller than its wavelength. Preferably, the acoustic wave has a frequency below 20 KHz, and in preferred embodiments is generated in a gaseous medium. The localized acoustic wave is then used to scan a target area. The interactions of the acoustic wave are sensed and patterns of interactions indicative of concealed items are identified. A schematic of a device for accomplishing this is illustrated in FIG. 3.

Figure 3:
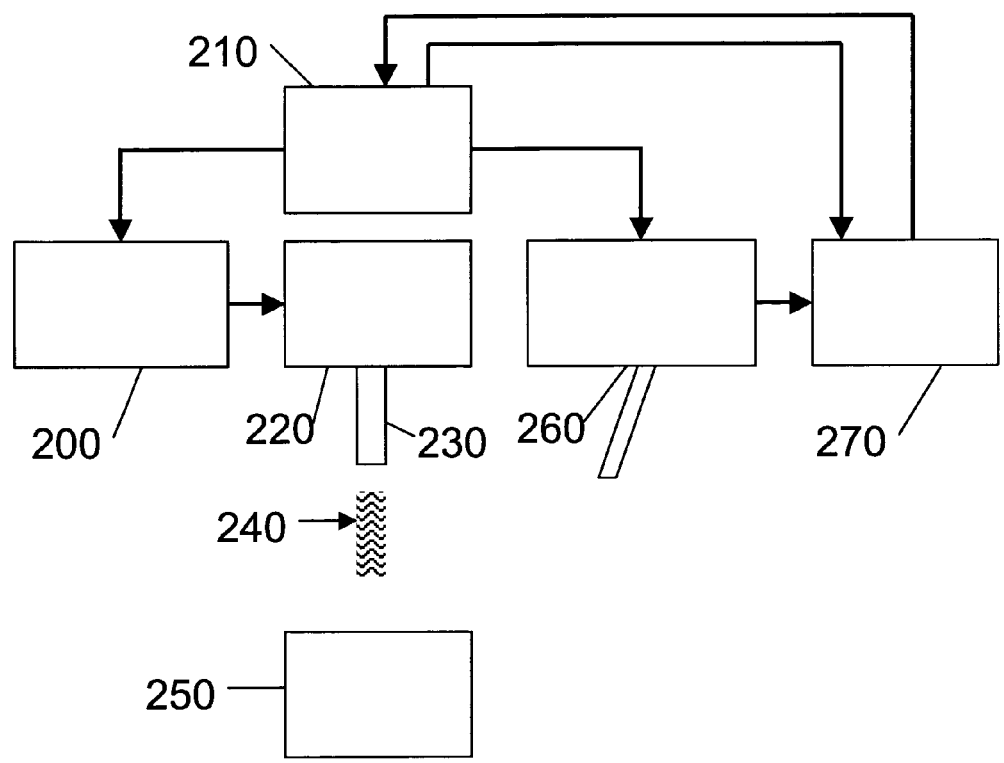
FIG. 3 shows a test configuration using a purely acoustic source.

FIG. 3 shows a test setup in which a purely acoustic source with frequency less than 20 KHz is used. A system controller 210 instructs a tone burst generator 200 to excite a speaker 220 that generates an acoustic wave in a gaseous medium inside a waveguide 230. An acoustic tone pulse 240 emerges and propagates to the target 250. Interactions, such as reflections from the target are detected by a directional microphone 260, which produces a corresponding electromagnetic signal that is received by the data processing system 270. In the embodiment shown, the controller 210 also controls the orientation of the directional microphone 260 and interacts with the data processing system 270. Patterns of interactions indicative of concealed items are identified. Although not shown in the figure, in some embodiments, flashing lights provide a visual cue when patterns of interactions indicative of concealed items are identified. Additional embodiments provide for the focusing of a light on a spot to be scanned. In preferred modes of operation, optical reflections from the spot are sensed by a light sensor and used to determine information about the spot based on the sensed optical reflections. Such information typically includes range, but may also include other spot qualities, such as vibration, speed or surface characteristics (specular or diffuse).

Preferred embodiments of the method generate the localized acoustic wave by the linear superposition of the ultrasonic waves to produce a beat, the non-linear mixing of the ultrasonic waves, or through both mechanisms. As discussed earlier, the localized acoustic wave can be produced either by mixing ultrasonic waves parametrically, or by mixing the ultrasonic waves in a small region in which the ultrasonic waves cross. In embodiments in which the localized acoustic wave is produced by the mixing of ultrasonic waves, the amount of localization is determined by the focusing of the ultrasonic waves. The more highly focused are the ultrasonic waves in the region in which they mix, the more highly localized will be the resultant localized acoustic wave. In preferred embodiments, the mixing is concentrated in a region of dimensions associated with a wavelength of one of the ultrasonic waves, typically one to three wavelengths. In typical embodiments, the ultrasonic wavelengths are of comparable size relative to that of the localized acoustic wave.

In some embodiments, the method employs a continuous wave system. However, in alternative embodiments the frequency of one or both ultrasonic waves is swept, thereby producing a swept acoustic wave at the difference frequency. The swept acoustic wave can be locked on a target resonance where the derivative of the acoustic wave amplitude versus frequency goes through zero, the lock point. Multiple target resonances can be mapped by sweeping the acoustic wave frequency.

The acoustic concealed item detector can also be operated in a pulsed mode by pulsing one or both of the ultrasonic sources with the bandwidth determined by the pulse width convolution and the frequency conversion mechanisms. The acoustic concealed item detector can operate in a tone burst or chirp mode by using a tone burst or chirp in one or both of the ultrasonic sources. The radiation pressure can be modulated by modulating one or both of the ultrasonic amplitudes. The modulating radiation pressure and the difference-frequency acoustic wave can thus act as a local acoustic tapping or disturbance at the modulation frequency and the difference frequency. The acoustic disturbance can be detected with a sensor receiver, such as a transducer, microphone or an accelerometer.

Spectral harmonics can be measured with the acoustic concealed item detector by sweeping the acoustic wave frequency and detecting target harmonics of that frequency. Spectral response of the target can be determined by sweeping the acoustic wave frequency and measuring the amplitude of the wave after it interacts with the target. Through the use of a pulsed mode of operation, one can measure the interaction as a function of time thus determining information as a function of depth.

Although not necessary, focusing at least one of the ultrasonic waves to the vicinity of the target area provides useful capability. Dynamically configuring a corresponding transducer to provide for an adjustable focus is also used in some embodiments. This can be done either by geometrically changing the transducer, or through the use spatial phasing of elements in the transducer. The focusing can be used to produce a localized concentrated acoustic interaction spot that has a characteristic dimension of about one or two or three wavelengths of the ultrasonic wave. This permits scanning at very high resolution. For example, a 100 KHz ultrasonic wave has a wavelength in air of about 3 mm. If the 100 KHz ultrasonic wave is mixed with a 101 KHz ultrasonic wave, the difference-frequency acoustic wave would have a frequency of 1 kHz, and a corresponding wavelength in air of 300 mm. Yet it is generated largely in the small concentrated acoustic interaction spot. This creates a unique capability—to scan an object with a resolution of 3 mm with a sound source having a wavelength of 300 mm.

The value of this approach is that the 1 KHz wave can penetrate and propagate through material that would block the 100 KHz wave. In this way, the scan produces information or images that are impossible to achieve with the ultrasonic wave alone. Furthermore, the near surface of the material where the prescribed mixing zone occurs will reflect the low frequency wave (1 KHz for example). Therefore, the system can detect with the 1 KHz wave surface anomalies at the higher resolution without having to detect the 100 KHz wave.

This can be very useful for gaseous-medium-coupled ultrasonics into materials that one might not want to touch with direct contact, such as skin wounds, hot materials, high purity liquids, moving surfaces, art work, or any surface for which direct solid contact would be undesirable. This approach provides for high resolution and the ability to penetrate at the same time, performance properties that are otherwise not possible.

Consistent with this ability, additional embodiments involve a method for high-resolution scanning of a target. This is accomplished by mixing ultrasonic waves, preferably in a gaseous medium, to produce a difference-frequency acoustic wave, preferably with a frequency less than 20 KHz. The mixing of the ultrasonic waves to produce a difference-frequency acoustic wave can occur through the beating of the ultrasonic waves, the non-linear mixing of the ultrasonic waves, or through both mechanisms. The difference-frequency acoustic wave should have a localized effective source confined to a scanning spot that is small relative to its wavelength. The method further includes scanning the target with the scanning spot. Within the scanning spot are the ultrasonic waves and the effective source of the difference-frequency acoustic wave. Interactions of the difference-frequency acoustic wave are sensed and target information is determined from the interactions. These interactions can include, but are not limited to: reflections, scatterings, diffractions, and frequency shiftings of the difference-frequency acoustic wave. In various embodiments the interactions occur between the difference-frequency acoustic wave and the target, other bodies, various transmission media, and/or the ultrasonic waves. Target information can include, but is not limited to: range, acoustic reflectivity relative to surroundings, geometry, impedance, stiffness, density, target speed, elastic modulus, etc. In various embodiments, the effective localized source is 2, 5, 10, or more times smaller than the wavelength of the difference-frequency acoustic wave. This method is most useful in situations where ultrasonic waves cannot effectively penetrate the target.

In addition, the acoustic concealed item detector can also be used for imaging solid or gas properties in the localized effective source region. Other aspects of the linear and non-linear interactions, such as the acoustic radiation pressure can also be used for moving materials and nanomaterials at a local scale.

The above description and drawings are only illustrative of some example embodiments, and the present invention is not intended to be limited thereto. Any additional modification of the present invention that comes within the spirit and scope of the following claims is considered part of the present invention.

What is claimed is:

1. An acoustic concealed item detector, comprising:
   a multi-frequency ultrasonic wave generator for generating in air or a gaseous medium, at least a first ultrasonic wave having frequency $f_1$, and a second ultrasonic wave having frequency $f_2$, the frequencies $f_1$ and $f_2$ both being between 100 KHz and 200 KHz, the multi-frequency ultrasonic wave generator being arranged such that in operation, the first ultrasonic wave and the second ultrasonic wave are focused to a prescribed mixing zone having a characteristic size of less than about 0.2 cm, within which a difference-frequency acoustic wave is produced, the difference-frequency acoustic wave having a frequency less than about 20 KHz;
   a receiver sensor for detecting interactions of the difference-frequency acoustic wave and producing corresponding electromagnetic signals; and
   a system processor for processing the electromagnetic signals and identifying signals indicative of concealed items.

2. The acoustic concealed item detector, according to claim 1, wherein:
   the multi-frequency ultrasonic wave generator comprises:
      a first transducer for producing the first frequency ultrasonic wave and
      a second transducer for producing the second frequency ultrasonic wave.

3. The acoustic concealed item detector, according to claim 2, wherein at least one of the first and second transducers is dynamically configurable.

4. The acoustic concealed item detector, according to claim 2, further comprising:
   a first actuator coupled to the first transducer, wherein during operation, the first actuator adjusts the position of the first transducer to direct the first ultrasonic wave.

5. The acoustic concealed item detector, according to claim 1, wherein the multi-frequency ultrasonic wave generator comprises a single transducer for parametrically generating the first and second ultrasonic waves.

6. The acoustic concealed item detector, according to claim 5, wherein the single transducer is dynamically configurable.

7. The acoustic concealed item detector, according to claim 5, further comprising:
   an actuator coupled to the single transducer, wherein during operation, the actuator adjusts the position of the single transducer to direct the ultrasonic waves.

8. The acoustic concealed item detector, according to claim 1, wherein the electromagnetic signals produced by the receiver sensor are transmitted wirelessly to the system processor.

9. The acoustic concealed item detector, according to claim 1, wherein the first ultrasonic wave has wave characteristics of amplitude, frequency, beam width, and beam divergence angle, wherein the acoustic concealed item detector is configured so that at least one of the wave characteristics is modifiable in operation.

10. The acoustic concealed item detector, according to claim 1, wherein the multi-frequency ultrasonic wave generator and the receiver sensor are disposed on a hand-held wand.

11. The acoustic concealed item detector, according to claim 1, further comprising:
    a light source, wherein during operation, the light source illuminates a spot to be scanned by the difference-frequency acoustic wave; and
    a light sensor, wherein during operation, the light sensor senses optical reflections of the light source from the spot scanned by the difference-frequency acoustic wave.

12. The acoustic concealed item detector, according to claim 1, further comprising:

a laser vibrometer, wherein during operation, the laser vibrometer illuminates a spot to be scanned by the difference-frequency acoustic wave.

13. The acoustic concealed item detector, according to claim 1, wherein the receiver sensor is a laser vibrometer.

14. An acoustic concealed item detector, comprising:
a multi-frequency ultrasonic wave generator for generating parametrically with a single transducer at least a first focused ultrasonic wave and a second focused ultrasonic wave; the multi-frequency ultrasonic wave generator being arranged such that in operation the first focused ultrasonic wave and the second focused ultrasonic wave are focused to a prescribed mixing zone, a difference-frequency acoustic wave being produced from the nonlinear interaction in air or a gaseous medium between the first focused ultrasonic wave and the second focused ultrasonic wave, the difference-frequency acoustic wave being delivered as an acoustic probing beam at the concealed item;
a receiver sensor for detecting interactions of the difference-frequency acoustic waves and producing corresponding electromagnetic signals; and
a system processor for processing the electromagnetic signals and identifying signals indicative of concealed items.

15. The acoustic concealed item detector, according to claim 14, wherein the single transducer is dynamically configurable.

16. The acoustic concealed item detector, according to claim 14, further comprising:
an actuator coupled to the single transducer, wherein during operation, the acuator adjusts the position of the single transducer to direct the ultrasonic waves.

17. The acoustic concealed item detector, according to claim 14, wherein the electromagnetic signals produced by the receiver sensor are transmitted wirelessly to the system processor.

18. The acoustic concealed item detector, according to claim 14, wherein the first ultrasonic wave has wave characteristics of amplitude, frequency, beam width, and beam divergence angle, wherein the acoustic concealed item detector is configured so that at least one of the wave characteristics is modifiable in operation.

19. The acoustic concealed item detector, according to claim 14, wherein the multi-frequency ultrasonic wave generator and the receiver sensor are disposed on a hand-held wand.

20. The acoustic concealed item detector, according to claim 14, further comprising:
a light source, wherein during operation, the light source illuminates a spot to be scanned by the difference-frequency acoustic wave; and
a light sensor, wherein during operation, the light sensor senses optical reflections of the light source from the spot scanned by the difference-frequency acoustic wave.

21. The acoustic concealed item detector, according to claim 14, wherein the multi-frequency ultrasonic wave generator is coupled to said air or said gaseous medium.

22. The acoustic concealed item detector, according to claim 14, further comprising:
a laser vibrometer, wherein during operation the laser vibrometer illuminates a spot to be scanned by the difference-frequency acoustic wave.

23. The acoustic concealed item detector, according to claim 14, wherein the receiver sensor is a laser vibrometer.

24. A method for detecting a concealed item behind a fabric or material-covered target area, the method comprising:
generating from a multi-frequency nonlinear wave interaction in air or gaseous medium a localized acoustic wave with a frequency below 20 KHz;
scanning the target area with the localized acoustic wave;
sensing interactions of the localized acoustic wave;
identifying patterns of interactions indicative of concealed items.

25. The method for detecting a concealed item behind a fabric or material-covered target area, according to claim 24, wherein:
the step of generating an acoustic wave is accomplished by mixing ultrasonic waves.

26. The method for detecting a concealed item behind a fabric or material-covered target area, according to claim 25, wherein:
the step of mixing ultrasonic waves occurs parametrically.

27. The method for detecting a concealed item behind a fabric or material-covered target area, according to claim 25, wherein:
the step of mixing ultrasonic waves occurs as a consequence of the crossing of the ultrasonic waves in a region of dimensions associated with a wavelength of one of the ultrasonic waves.

28. The method for detecting a concealed item behind a fabric or material-covered target area, according to claim 25, further comprising the step of:
pulsing at least one of the ultrasonic waves.

29. The method for detecting a concealed item behind a fabric or material-covered target area, according to claim 25, further comprising the step of:
modulating radiation pressure by amplitude modulating at least one of the ultrasonic waves.

30. The method for detecting a concealed item behind a fabric or material-covered target area, according to claim 29, wherein:
the amplitude modulating of at least one of the ultrasonic waves is done at a modulation frequency and the modulating radiation pressure acts as a local acoustic disturbance at the modulation frequency.

31. The method for detecting a concealed item behind a fabric or material-covered target area, according to claim 25, further comprising the step of:
focusing at least one of the ultrasonic waves to the vicinity of the target area.

32. The method for detecting a concealed item behind a fabric or material-covered target area, according to claim 31, wherein:
the focusing of at least one of the ultrasonic waves involves dynamically configuring a corresponding transducer.

33. The method for detecting a concealed item behind a fabric or material-covered target area, according to claim 24, further comprising the step of:
sweeping the frequency of the acoustic wave.

34. The method for detecting a concealed item behind a fabric or material-covered target area, according to claim 33, further comprising the step of:
identifying resonances as frequencies in which the sensed interactions of the acoustic wave have a zero derivative of amplitude with respect to frequency.

35. The method for detecting a concealed item behind a fabric-covered target area, according to claim 24, further comprising the steps of:
directing a light to a spot being scanned;

sensing optical reflections of the light from the spot; and
determining information about the spot based on the sensed optical reflections.

38. The method for detecting a concealed item behind a fabric-covered target area, according to claim 35, further including the step of:
focusing the light on the spot.

37. The method for detecting a concealed item behind a fabric-covered target area, according to claim 24 wherein the step of generating an acoustic wave occurs through the linear superposition of the ultrasonic waves to produce a beat.

38. The method for detecting a concealed item behind a fabric-covered target area, according to claim 24 wherein the step of generating an acoustic wave occurs through non-linear interaction of the ultrasonic waves.

39. The method for detecting a concealed item behind a fabric-covered target area, according to claim 24 wherein the step of generating an acoustic wave occurs through both the non-linear interaction of the ultrasonic waves and the linear superposition of the ultrasonic waves to produce a beat.

40. An acoustic concealed item detector, comprising:
a multi-frequency ultrasonic wave generator for generating at least a first ultrasonic wave, and a second ultrasonic wave, the multi-frequency ultrasonic wave generator being arranged such that in operation, the first ultrasonic wave and the second ultrasonic wave mix in a prescribed mixing zone within which a difference-frequency acoustic wave is produced from the nonlinear interaction in air or a gaseous medium between the first focused ultrasonic wave and the second focused ultrasonic wave, the difference-frequency acoustic wave being delivered as an acoustic probing beam at the concealed item;

a vibrometer for detecting interactions of the difference-frequency acoustic wave and producing corresponding electromagnetic signals; and a system processor for processing the electromagnetic signals and identifying signals indicative of concealed items.

41. The acoustic concealed item detector, according to claim 40, wherein:
the vibrometer is a laser vibrometer.

* * * * *